United States Patent
Llop et al.

(10) Patent No.: US 10,729,521 B2
(45) Date of Patent: Aug. 4, 2020

(54) DENTAL IMPRESSION TRAY SYSTEM AND METHODS OF USE THEREOF

(71) Applicant: NATIONAL DENTEX, LLC, Palm Beach Gardens, FL (US)

(72) Inventors: Daniel R. Llop, Reno, NV (US); Ryan A. Spanke, Reno, NV (US)

(73) Assignee: NATIONAL DENTEX, LLC, Palm Beach Gardens, FL (US)

( * ) Notice: Subject to any disclaimer, the term of this patent is extended or adjusted under 35 U.S.C. 154(b) by 277 days.

(21) Appl. No.: 15/457,868

(22) Filed: Mar. 13, 2017

(65) Prior Publication Data
US 2017/0258560 A1     Sep. 14, 2017

Related U.S. Application Data

(60) Provisional application No. 62/307,409, filed on Mar. 11, 2016.

(51) Int. Cl.
*A61C 9/00* (2006.01)
*A61C 13/107* (2006.01)
*A61C 13/10* (2006.01)

(52) U.S. Cl.
CPC ........ *A61C 9/0006* (2013.01); *A61C 13/0001* (2013.01); *A61C 13/10* (2013.01)

(58) Field of Classification Search
CPC ... A61C 9/0006; A61C 13/0001; A61C 13/10; A61C 13/1016; A61C 13/1013;
(Continued)

(56) References Cited

U.S. PATENT DOCUMENTS 2,817,900 A * 12/1957 Glasser ................ A61C 13/225
                                                                    433/168.1
3,335,495 A     8/1967 Wichner
(Continued)

FOREIGN PATENT DOCUMENTS

DE         10009906 C1 *  6/2001  ......... A61C 13/0025
WO   WO-2012145793 A1 * 11/2012  ........... A61C 11/003

OTHER PUBLICATIONS

"Rail Definition", 2019, Merriam-Webster, https://www.merriam-webster.com/dictionary/rail, Feb. 6, 2019 (Year: 2019).*
(Continued)

*Primary Examiner* — Sean M Michalski
*Assistant Examiner* — Shannel N Wright
(74) *Attorney, Agent, or Firm* — Frost Brown Todd LLC

(57) ABSTRACT

A dental tray impression system, including at least one of a top denture and a bottom denture, and methods of use thereof. A top denture may include (a) a top dental impression tray including an upper trough on a palatal side and configured such that the upper trough fits adjacent to a top alveolar ridge of a patient's mouth and (b) a top tooth portion configured to removably attach to a cavity side of an anterior end of the top dental impression tray. A bottom denture may include (a) a bottom dental impression tray comprising a lower trough on a mandibular side and configured such that the lower trough fits adjacent to a bottom alveolar ridge of the patient's mouth and (b) a bottom tooth portion configured to removably attach to the cavity side of the anterior end of the bottom dental impression tray.

19 Claims, 10 Drawing Sheets

(58) Field of Classification Search
CPC ............ A61C 13/1009; A61C 13/1006; A61C 13/0025; A61C 13/01; A61C 9/00; A61C 9/04; A61C 11/005; A61C 11/006; A61C 19/05; A61C 19/052; A61C 19/045; A61C 13/0024; A61C 13/102; A61C 13/2653; A61C 13/273; A61C 13/275; A61C 2013/2753; A61C 2013/2756
See application file for complete search history.

(56) References Cited

U.S. PATENT DOCUMENTS

| | | | | |
|---|---|---|---|---|
| 3,644,996 | A * | 2/1972 | Weinkle | A61C 13/04 433/171 |
| 4,345,900 | A * | 8/1982 | Katz | A61C 9/00 433/171 |
| 4,370,134 | A | 1/1983 | Roberts | |
| 4,470,815 | A | 9/1984 | Hazar | |
| 4,657,509 | A * | 4/1987 | Morris | A61C 9/0006 433/171 |
| 5,203,700 | A * | 4/1993 | Chmel | A61C 13/0025 433/169 |
| 5,885,077 | A * | 3/1999 | Jeffer | A61C 8/00 433/168.1 |
| 5,895,218 | A | 4/1999 | Quinn et al. | |
| 5,961,325 | A * | 10/1999 | Van Handel | A61C 9/0006 433/213 |
| 9,173,723 | B2 | 11/2015 | Harrison | |
| 9,226,801 | B2 | 1/2016 | Groscurth et al. | |
| 9,408,678 | B2 | 8/2016 | Harrison | |
| 9,498,307 | B2 | 11/2016 | Harrison | |
| 9,504,533 | B2 | 11/2016 | Groscurth et al. | |
| 9,554,879 | B2 | 1/2017 | Harrison | |
| 2005/0112523 | A1 * | 5/2005 | Massad | A61C 11/06 433/68 |
| 2009/0246729 | A1 | 10/2009 | Massad | |
| 2009/0298008 | A1 | 12/2009 | Groscurth et al. | |
| 2010/0124731 | A1 | 5/2010 | Groscurth et al. | |
| 2011/0045431 | A1 | 2/2011 | Groscurth et al. | |
| 2011/0045432 | A1 | 2/2011 | Groscurth et al. | |
| 2011/0129796 | A1 * | 6/2011 | Riggio | A61C 9/0006 433/171 |
| 2012/0148978 | A1 * | 6/2012 | Suchan | A61C 9/0006 433/38 |
| 2014/0356806 | A1 * | 12/2014 | Liebman | A61C 9/002 433/37 |
| 2015/0064644 | A1 * | 3/2015 | Scherer | A61C 9/0006 433/29 |
| 2015/0190216 | A1 * | 7/2015 | Suga | A61C 9/0006 433/213 |
| 2015/0305838 | A1 * | 10/2015 | Liebman | A61C 9/0006 433/41 |
| 2016/0008106 | A1 * | 1/2016 | Chiou | A61C 9/0006 433/37 |
| 2016/0106517 | A1 | 4/2016 | Groscurth et al. | |
| 2016/0106525 | A1 * | 4/2016 | Kim | A61C 19/05 433/42 |
| 2016/0324599 | A1 | 11/2016 | Harrison | |
| 2017/0071697 | A1 | 3/2017 | Groscurth et al. | |
| 2017/0112592 | A1 | 4/2017 | Groscurth et al. | |
| 2017/0239023 | A1 * | 8/2017 | Marks | A61C 13/0004 |
| 2018/0344438 | A1 * | 12/2018 | Boehm | A61C 13/0004 |
| 2020/0054422 | A1 * | 2/2020 | Michii | A61C 13/097 |

OTHER PUBLICATIONS

"Groove", 2019, Dictionary, https://www.dictionary.com/browse/groove, Feb. 6, 2019 (Year: 2019).*
International Search Report and the Written Opinion of the International Searching Authority dated May 25, 2017 in connection with International Patent Application No. PCT/US2017/022191.

* cited by examiner

DENTAL IMPRESSION TRAY SYSTEM AND METHODS OF USE THEREOF

CROSS-REFERENCE TO RELATED APPLICATIONS

This application claims priority to the provisional filing U.S. Application No. 62/307,409 filed Mar. 11, 2016, the contents of which are hereby incorporated in their entirety by reference.

FIELD OF THE DISCLOSURE

The present invention relates, in some embodiments, to dental impression trays. In some embodiments, a dental impression tray may support artificial teeth.

BACKGROUND OF THE DISCLOSURE

When one or both of a patient's alveolar ridges (e.g., the two jaw ridges, one jaw ridge being generally located on the roof of the mouth between the upper teeth and the hard palate while the other jaw ridge is generally located on the bottom of the mouth behind the lower teeth) are rendered edentulous (i.e., toothless), full plate dentures may be desirable to restore the patient's bite. However, generating a denture or denture set for a partially or completely edentulous patient often involves numerous steps, requiring the patient to make multiple visits to their dental care provider. A first patient visit can include generating a preliminary impression mold by applying a stock dental impression tray filled with an impression material (e.g., alginate) to one or more of the patient's alveolar ridges, allowing the impression material to cure, and removing the cured impression material from the patient's mouth thereby forming the preliminary impression mold. A preliminary impression mold may be used to generate one or more custom dental impression trays. At a second patient visit, the custom dental impression trays may be filled with impression material (e.g., PVS or polyether) and applied to the patient's alveolar ridges to make one or more master impressions. Upon the substantial curing of the impression material, the trays with their alveolar ridges master impressions (e.g., an impression cavity) can be removed from the patient's mouth and used to make a record base and wax rim combination and a master cast. Master casts (e.g., models) of the alveolar ridge(s) may be manufactured by filling in the impression cavity and surrounding area with casting material (e.g., dental stone). Once the casting material has cured, the master cast can be removed from the master impression.

At a third patient visit, the combination could be applied to the alveolar ridges, the record base can be used to check the patient's existing edentulous bite while the wax rims can be contoured for lip support, future incisal edge position, occlusal plane, occlusal vertical dimension and midline. The patient's facebow transfer and bite registration can be recorded at this time for the correct vertical dimension. The artificial teeth may be also selected for tooth model, tooth shade and desired occlusal scheme.

The recorded information, artificial teeth selection, and master casts may then be used to create an initial or temporary denture set. The master casts can be set in an articulator, a hinged device that holds the castings in opposing positions to generally allow the castings to replicate the patient's jaw hinge movement and bite relationship. The combination or a bite block can also be placed between the two castings to show the patient's current bite alignment of the two jaws. That bite block information could then be used formulate or otherwise identify what the proper alignment of the two jaws would be when the teeth (artificial) are located upon the alveolar ridge(s). Bite block information, aesthetics, and other oral considerations can be used to help identify how and where the artificial teeth can be applied to the casts by warmed dental wax. The teeth-to-cast application may be a complete set-up of all the artificial teeth, or a partial set-up with only the maxillary anterior teeth (e.g., front bottom and top teeth). In the event that a partial set-up is used, additional patient appointments may be used to set the remaining teeth. The sequence of artificial teeth application could start with the top front teeth being attached and aligned, followed by the bottom front teeth, then sets of side teeth, and lastly the molars. The articulator can be opened and closed during the artificial teeth application process to substantially evaluate how the bite reconstruction is progressing. Once the artificial teeth are set in place, teeth-cast combinations can be removed from the articulator to facilitate the building up of the gum portion of upon the master casts using additional dental wax to finally form the temporary or intermediate wax gum-artificial teeth denture.

At yet another patient visit, temporary or intermediate (e.g., wax gum-artificial teeth) dentures can be removed from the master casts and evaluated on the patient for accuracy of mounting, occlusal vertical dimension, esthetics, and phonetics. Appropriate adjustment to the dentures can be made as needed (e.g., wax gum underside could be adjusted to improve the wax gum-to-alveolar ridge fit).

In some cases, for example where a denture was not fitted to the patient (e.g., remained attached to the casting) or where a temporary denture was fitted and adjusted, a next step may include replacing a wax gum with an acrylic gum. This may involve placing a protective polymer coating (e.g., Blu Mousse®) on the set of artificial teeth. The casting and wax denture combination can then be sprayed with a releasing agent and placed into a dental flask (e.g., a mold-forming two part container) that is partially filled with dental stone. After the bottom of the casting is placed within the dental flask and generally applied to the dental stone, a wax vent sprue may be attached to the exposed wax gum. Additional dental stone can be applied though an opening in the assembled flask to cover up the remaining uncovered portion of the casting and the wax vent sprue. After the dental stone has dried, the flask could be heated in hot water bath to allow the wax gum and sprue to melt and then be poured out of the flask to form hollow gum cavity. An open-ended cylinder containing dental acrylic can then be applied to the flask to inject the dental acrylic into the hollow gum cavity formed by the removal/melting of the wax vent sprue. The flask-cylinder combination can be placed into an injection machine that could use mechanical, hydraulic, or pneumatic pressure means to inject the acrylic from the cylinder into the hollow gum cavity. The injected dental acrylic could then be fixed or cured (e.g., by heat when the entire flask is placed in a hot water bath). After curing of the acrylic gum, the flask can be opened to release the stone-encased formed denture. After carefully removing the stone covering and casting away from the denture, the protective polymer can be exposed and removed from the teeth. The denture can then be cleaned up and an additional appointment made with the patient for denture application, final fitting, and adjustment. Additional patient appointments may be made for further denture fitting observations and adjustments.

As can be appreciated the above denture manufacture procedure may require significant time, money, materials and numerous patient visits before producing a usable denture(s). The following disclosure describes, in some embodiments, a dental impression tray system configured to significantly bypass, incorporate, or eliminate several of the denture making steps and may reduce the time, costs, materials, and number of patient visits needed to produce a denture.

SUMMARY

The various embodiments of the present invention may, but do not necessarily, achieve one or more of the following advantages:

to provide a dental impression tray that supports a removable teeth portion;

the ability to interchange teeth portions removably attached to dental impression tray to present a restorative bite;

to provide a dental tray that takes a dental impression, supports a removable teeth portion for establishing a restorative bite, the dental tray and attached teeth portions being subsequently subject to dental scans to provide manufacturing data and parameters need to digitally manufacture a denture;

the ability to eliminate the need for wax mockup dentures, gum wax structures, and acrylic replacement of wax gums in denture design and manufacturing;

to provide a dental impression tray that adjustably moves a teeth portion forward or back upon the base of a dental impression tray to make a bite adjustment; and the ability make a denture directly out of a finalized dental impression tray that supports a now fixed teeth portion.

These and other advantages may be realized by reference to the remaining portions of the specification, claims, and abstract.

A dental tray impression system, according to some embodiments of the disclosure may include at least one of a top denture and a bottom denture. A top dentures, in some embodiments may include (a) a top dental impression tray including an upper trough on a palatal side and configured such that the upper trough fits adjacent to a top alveolar ridge of a patient's mouth and (b) a top tooth portion configured to removably attach to a cavity side of an anterior end of the top dental impression tray. According to some embodiments, a bottom denture may include (a) a bottom dental impression tray comprising a lower trough on a mandibular side and configured such that the lower trough fits adjacent to a bottom alveolar ridge of the patient's mouth and (b) a bottom tooth portion configured to removably attach to the cavity side of the anterior end of the bottom dental impression tray. In some embodiments, an upper trough and a lower trough may be configured to contain at least a portion of a moldable dental impression material.

The present disclosure relates, in some embodiments, to a method of using a dental impression tray system, the method including: preparing one or more patient oral sites; assembling at least one of top denture or a bottom denture; forming at least one of a top mold gasket or a bottom mold gasket; adjusting the patient's bite; fixing at least one of the top denture or the bottom denture; and processing the fixed top denture or the fixed bottom denture to generate a final denture.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the specific phrasing and terminology employed herein are for the purpose of description and should not be regarded as limiting.

BRIEF DESCRIPTION OF THE DRAWINGS

Some embodiments of the disclosure may be understood by referring, in part, to the present disclosure and the accompanying drawings, wherein.

DETAILED DESCRIPTION

The present disclosure relates, in some embodiments, to a dental impression tray system. In the following detailed description, reference is made to accompanying drawings which form a part of this application. The drawings show, by way of illustration, specific embodiments in which the invention may be practiced. It is to be understood that other embodiments may be utilized and structural changes may be made without departing from the scope of the present disclosure.

Figure 1A:
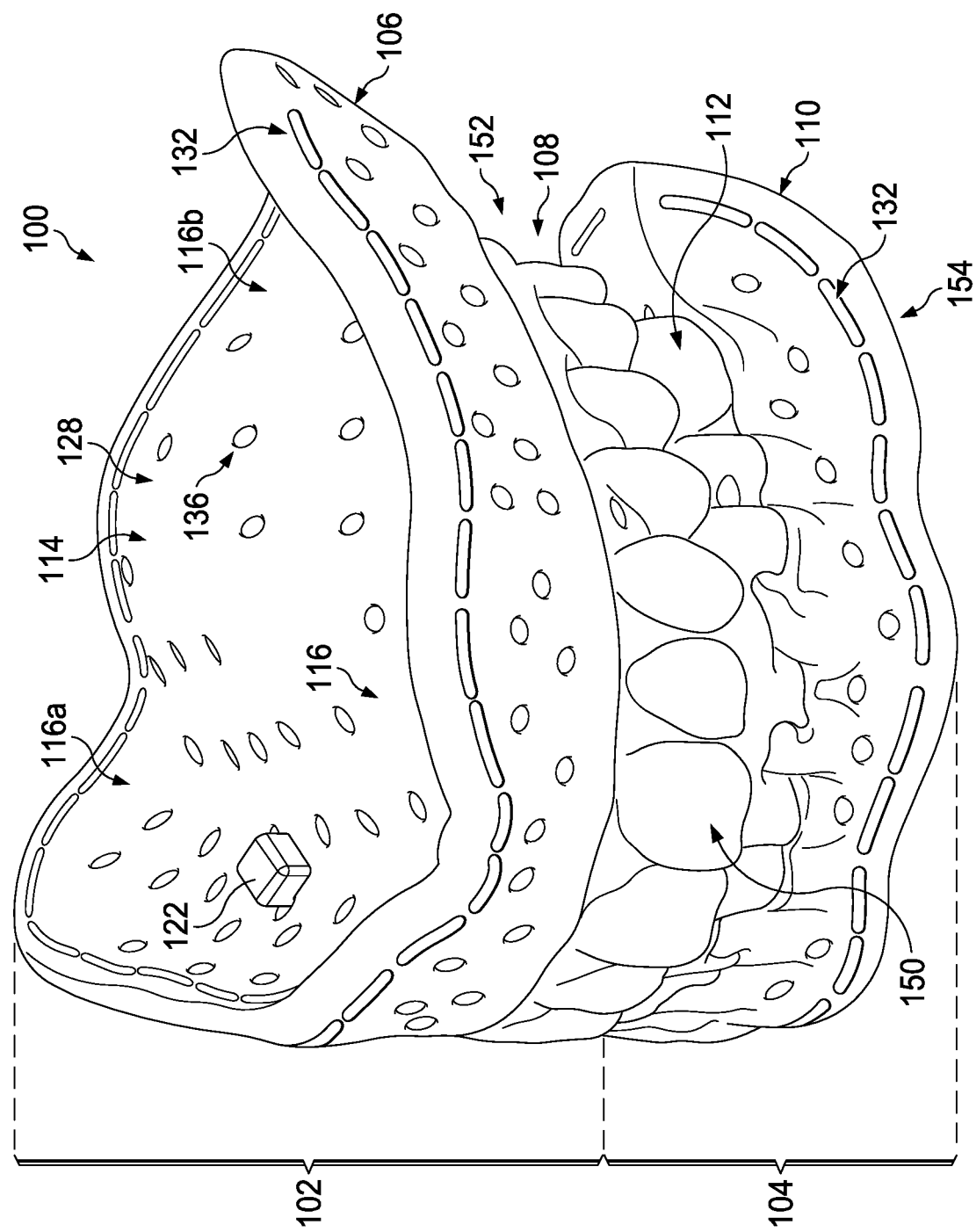
FIG. 1A illustrates a front-angular perspective view of a dental impression tray system, according to one embodiment of the disclosure.
Figure 1B:
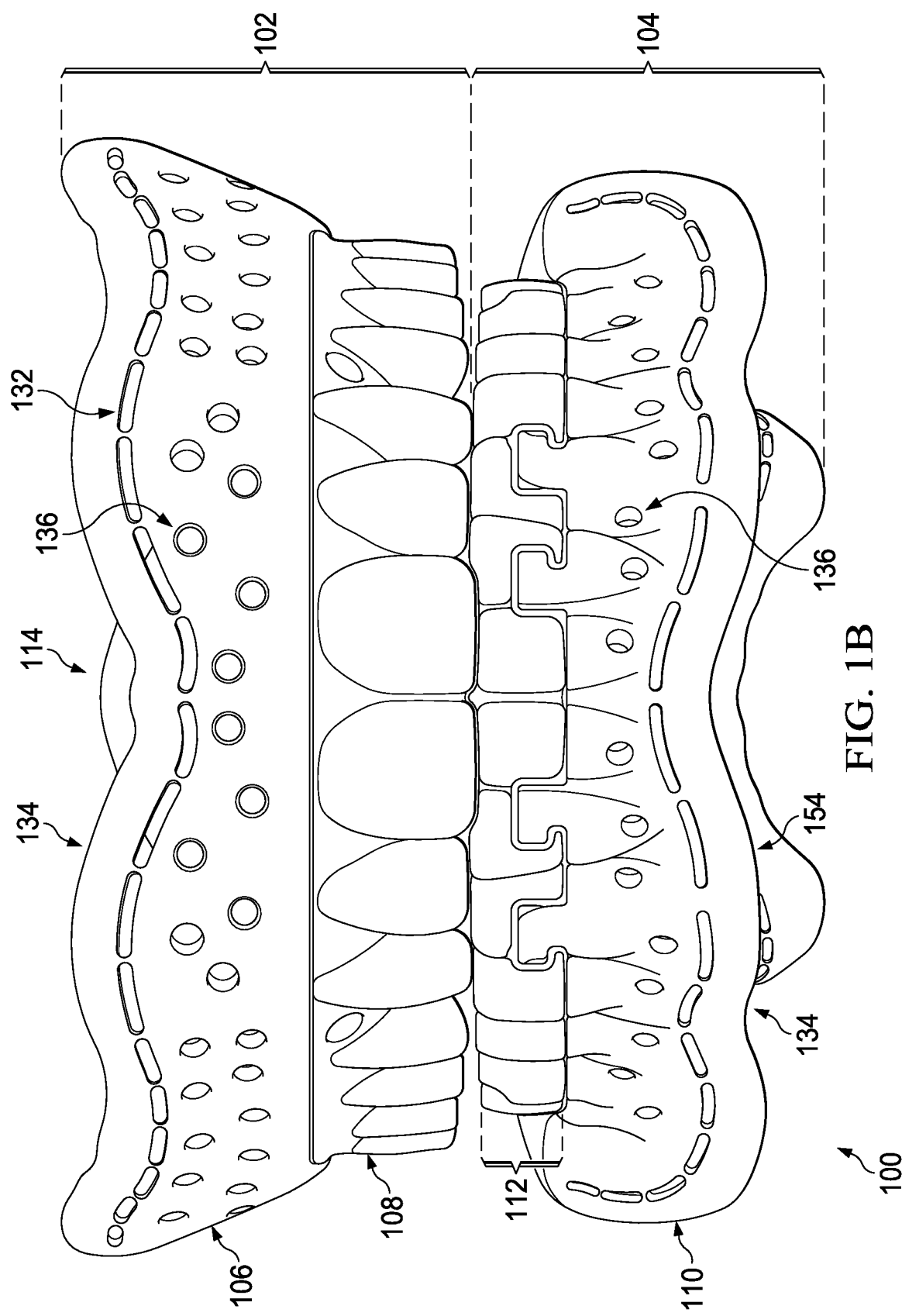
FIG. 1B illustrates a front perspective view of a dental impression tray system, according to one embodiment of the disclosure.
Figure 1C:
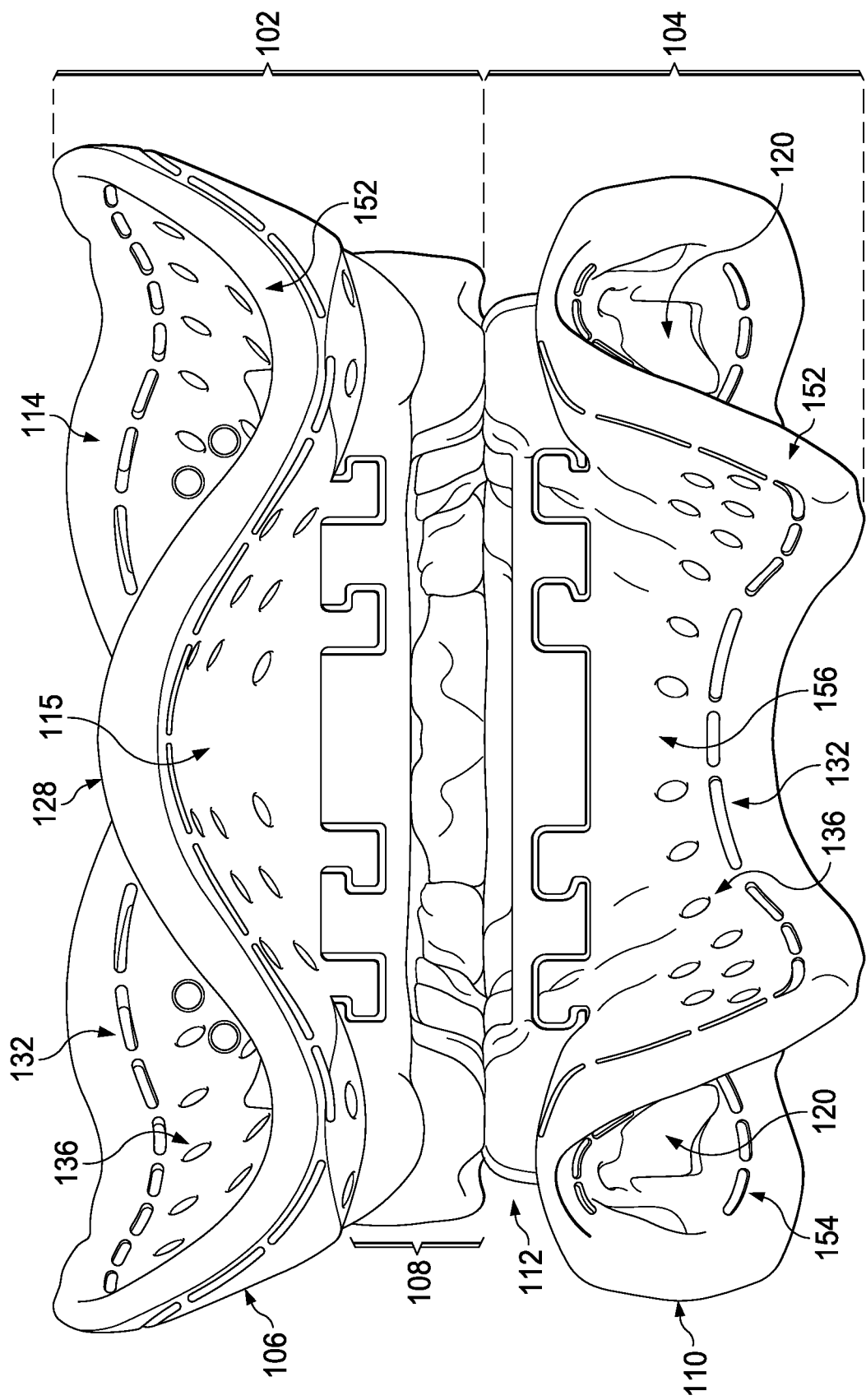
FIG. 1C illustrates a back perspective view of a dental impression tray system, according to one embodiment of the disclosure.
Figure 1D:
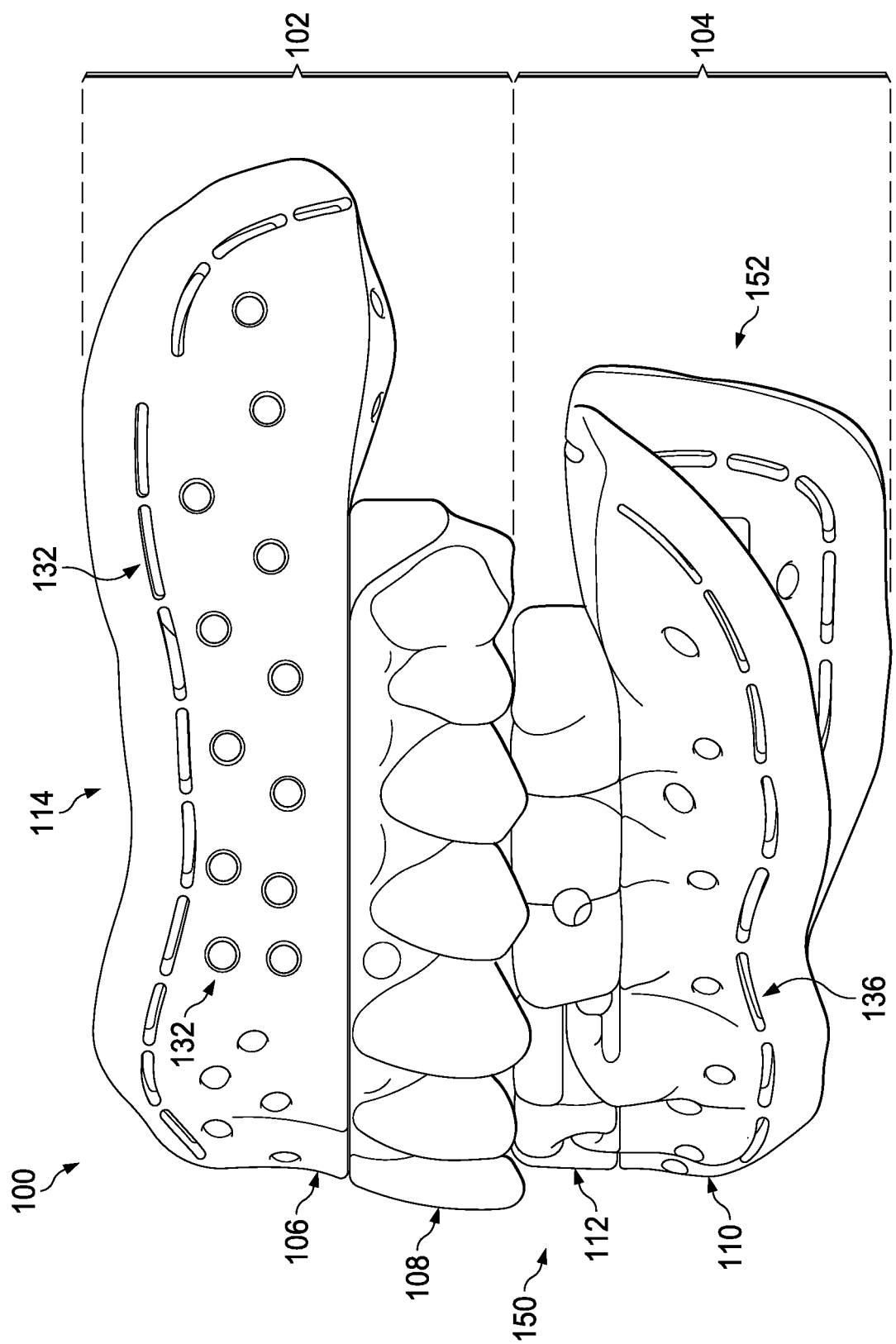
FIG. 1D illustrates a side perspective view of a dental impression tray system, according to one embodiment of the disclosure.

FIG. 1A illustrates a front-angular perspective of a dental impression tray system 100, according to one embodiment of the present disclosure. FIG. 1B illustrates a front perspective view of a pair of a dental impression tray system 100, according to one embodiment of the disclosure. FIG. 1C illustrates a back perspective view of a dental impression tray system 100, according to one embodiment of the disclosure. FIG. 1D illustrates a side perspective view of a dental impression tray system 100, according to one embodiment of the disclosure.

As illustrated in FIG. 1A, FIG. 1B, FIG. 1C, FIG. 1D, and FIG. 1E, some embodiments of the present invention includes a dental impression tray system 100 comprising a top denture 102 configured to fit adjacent to an edentulous, top alveolar ridge of a patient's mouth and a bottom denture 104 configured to fit adjacent to an edentulous, bottom alveolar ridge of the patient's mouth. According to some embodiments, a dental impression tray system 100 may include only a top denture 102 or only a bottom denture 104, as necessitated by a patient's anatomy (e.g., a patient is only edentulous on a top or bottom jaw).

As shown in FIG. 1A, a top denture 102, in some embodiments, may include a top dental impression tray 106 and a top tooth portion 108. A bottom denture 104, according to some embodiments, may include a bottom dental impression tray 110 and a bottom tooth portion 112.

According to some embodiments, at least one of a top dental impression tray 106 and a bottom dental impression tray 110 may be prefabricated in accordance with average patient characteristics (e.g., available for commercial purchase) or may be fabricated for a specific patient (e.g., based on a patient's dental records, molds, x-rays, and prior impressions). At least one of a top dental impression tray 106 and a bottom dental impression tray 110, in some embodiments, may be fabricated using 3D printing or similar technologies.

In some embodiments, at least one of a top dental impression tray 106 and a bottom dental impression tray 110 may be composed of biocompatible materials suitable for use in a patient's mouth (e.g., laboratory chemical-cured, light-cured, thermoplastic resins, polymers, plastics, fiber mesh, metals, chromium cobalt, titanium). At least one of a top dental impression tray 106 and a bottom dental impression tray 110 may be porous, perforated, rim-lock, or solid, in some embodiments. According to some embodiments, at least one of a top dental impression tray 106 and a bottom dental impression tray 110 may include pores, holes, slits, or other mechanisms through which liquid can pass.

A top dental impression tray 106 may include a palatal side 114 facing a patient's palate and a cavity side facing the patient's oral cavity (e.g., FIG. 1C 115). A bottom dental impression tray 110 may include a mandibular side 154 facing a patient's mandible and a cavity side facing a patient's oral cavity (e.g., FIG. 1C 156). Moreover, a top dental impression tray 106 and a bottom dental impression tray 110 may each further include an anterior end 150 facing a patient's lips and mouth and a posterior end 152 facing the patient's throat and esophagus.

As shown in FIG. 1A, a palatal side 114 of a top dental impression tray 106 may be configured to fit to an edentulous top alveolar ridge of a patient's mouth. In some embodiments, a dental impression tray system 100 may include an upper trough 116 configured to facilitate a more precise fit between a palatal side 114 of a top denture impression tray 106 and an edentulous top alveolar ridge of a patient's mouth. An upper trough 116, in some embodiments, may have a U-shape (e.g., in lateral cross section, in longitudinal cross-section, overall). According to some embodiments, an upper trough 116 may have a U-shape configured to substantially conform with at least a portion of a patient's upper alveolar ridge.

According to some embodiments, an upper trough 116 may be configured to contain at least a portion of a moldable dental impression material and may be used to take an impression of an edentulous upper alveolar ridge. In some embodiments, a moldable dental impression material may include, but is not limited, to: alginate, irreversible hydrocolloid, reversible hydrocolloid (agar), polymers, silicones, silicone rubber materials, polyethers, poly (ethylene), poly (vinyl chloride), poly urethanes, poly lactides, polyvinyl siloxane PVS, natural polymers (e.g., collagen, gelatin, elastin, silk, polysaccharide, polysulfides), or any combination thereof. An upper trough 116 of a top denture impression tray 106, in some embodiments, may include one or more space blockers 122. A space blocker 122 may be configured to penetrate a moldable impression material (e.g., alginate) and to generally contact a patient's top alveolar ridge such that the patient is signaled to stop applying pressure to the moldable impression material (e.g., to stop biting down). Accordingly, in some embodiments, a space blocker 122 may substantially prevent a patient from applying too much pressure to the impression material (e.g., biting down to a bottom region of a U-shaped trough) and thereby facilitate proper impression formation.

A top dental impression tray 106 may include a hard palate portion 128 configured to fit adjacent to a patient's hard palate and, in some embodiments, to support a moldable dental impression material (e.g., alginate). According to some embodiments, a hard palate portion 128 may be substantially flat or have a gentle convexity to mimic a patient's hard palate. A top dental impression tray 106 may be configured with a hard palate portion 128 located between a first arm 116a and a second arm 116b of a trough 116, as illustrated in FIG. 1A, where the trough has a substantially U-shape.

As shown in FIG. 1C, a mandibular side (i.e., mandibular jaw-facing) 154 of a bottom denture impression tray 110 may be configured to fit to an edentulous bottom alveolar ridge of a patient's mouth. In some embodiments, a dental impression tray system 100 may include a lower trough 120 configured to facilitate a more precise fit between a mandibular side 154 of a bottom denture impression tray 110 and an edentulous bottom alveolar ridge of a patient's mouth. A lower trough 120, in some embodiments, may have a U-shape (e.g., in lateral cross section, in longitudinal cross-section, overall). According to some embodiments, a lower trough 120 may have a U-shape configured to substantially conform with at least a portion of a patient's lower alveolar ridge.

A lower trough 120, in some embodiments, may be configured to contain at least a portion of a moldable dental impression material and may be used to take an impression of an edentulous lower alveolar ridge. In some embodiments a moldable dental impression material may include, but is not limited to: alginate, irreversible hydrocolloid, reversible hydrocolloid (agar), polymers, silicones, silicone rubber materials, polyethers, poly (ethylene), poly (vinyl chloride), poly urethanes, poly lactides, polyvinyl siloxane PVS, natural polymers (e.g., collagen, gelatin, elastin, silk, polysaccharide, polysulfides), or any combination thereof. A lower trough 120 of a bottom denture impression tray 110, in some embodiments, may include one or more space blockers (not shown). According to some embodiments, a lower trough 120 may be configured to contain at least a portion of a moldable dental impression material (e.g., alginate) and may be used to take an impression of an edentulous lower alveolar ridge. A space blocker may be configured to penetrate a moldable impression material (e.g., alginate) and to generally contact a patient's lower alveolar ridge such that the patient is signaled to stop applying pressure to the moldable impression material (e.g., to stop biting down). Accordingly, in some embodiments, a space blocker may substantially prevent a patient from applying too much pressure to the impression material (e.g., biting down to a bottom region of a U-shaped trough) and thereby facilitate proper impression formation.

According to some embodiments, at least one of a top dental impression tray 106 and a bottom dental impression tray 110 may include one or more indentations 136. In some embodiments, at least one of an upper trough 116 and a lower trough 120 may include one or more indentations 136. An indentation 136 may partially or completely penetrate at least one of a top dental impression tray 106 and a bottom dental impression tray 110. According to some embodiments, an indentation may be configured to enhance fixation of a moldable material (e.g., alginate) to one or more regions of at least one of a top dental impression tray 106 and a bottom dental impression tray 110, for example an upper trough 116 or a lower trough 120 respectively.

FIG. 1B illustrates a front perspective view of a dental impression tray system 100, according to one embodiment of the disclosure. According to some embodiments, at least one of a top dental impression tray 106 and a bottom dental impression tray 110 may be configured to allow for adjustment of a depth of an upper trough 116 or a lower trough 120 respectively. In some embodiments, at least one of a top dental impression tray 106 and a bottom dental impression tray 110 may include multiple perforations 132 extending substantially parallel to a proximate edge 134 of the palatal side 114 and the mandibular side 154, respectively. According to some embodiments, at least one of a top dental impression tray 106 and a bottom dental impression tray 110 may be configured to facilitate an adjustment of a depth of an upper trough 116 or a lower trough 120 respectively by cleaving the multiple perforations 132 and removing at least a portion of a proximate edge 134 of the respective trays. Such adjustment of a depth of an upper trough 116 or a lower trough 120 may permit a dental impression tray to more closely align with a patient's top or bottom alveolar ridge, respectively.

FIG. 1C illustrates a back perspective view of a dental impression tray system 100, according to one embodiment of the disclosure, having a posterior end 152 configured to face a patient's throat opposite an anterior end (e.g., FIG. 1A 150) configured to face a patient's mouth and lips.

In some embodiments, as illustrated in FIG. 1C, a top dental impression tray 106 may be configured to fit adjacent to both an edentulous top alveolar ridge (not shown) and a hard palate (not shown) of a patient's mouth. A top dental impression tray 106 may include a hard palate portion 128 configured to fit adjacent to a patient's hard palate and, in some embodiments, to support a moldable dental impression material (e.g., alginate).

As illustrated in FIG. 1C, a bottom dental impression tray 110 may be configured to accommodate a patient's tongue, according to some embodiments. In some embodiments, a bottom dental impression tray may include a tongue cutout intended to accommodate a patient's tongue.

According to some embodiments, a top dental impression tray 106 and a bottom dental impression tray 110 may be substantially identical. In some embodiments, a single design of a dental impression tray may be configured such that the dental impression tray may be used as is for a top dental impression tray and may be readily adapted to form a bottom dental impression tray 110 by forming a tongue cutout (e.g., removal of tongue cut out portion using perforations). According to some embodiments, a dental impression tray may include a series of perforations outlining a tongue cutout, such that a practitioner may more readily remove a portion of the dental impression tray to form the tongue cutout. In some embodiments, a series of perforations outlining a tongue cutout may be located in the region surrounding a hard palate portion 128 of a dental impression tray.

FIG. 1D illustrates a side perspective view of a dental impression tray system 100, according to one embodiment of the disclosure. According to some embodiments, a top teeth portion 108 may be oriented on a cavity side 115 of an anterior end 150 (towards a patient's mouth and lips) of a top dental impression tray 106. In some embodiments, a bottom teeth portion 112 may be oriented on a cavity side 156 of an anterior end 150 of a bottom dental impression tray 110.

Figure 1E:
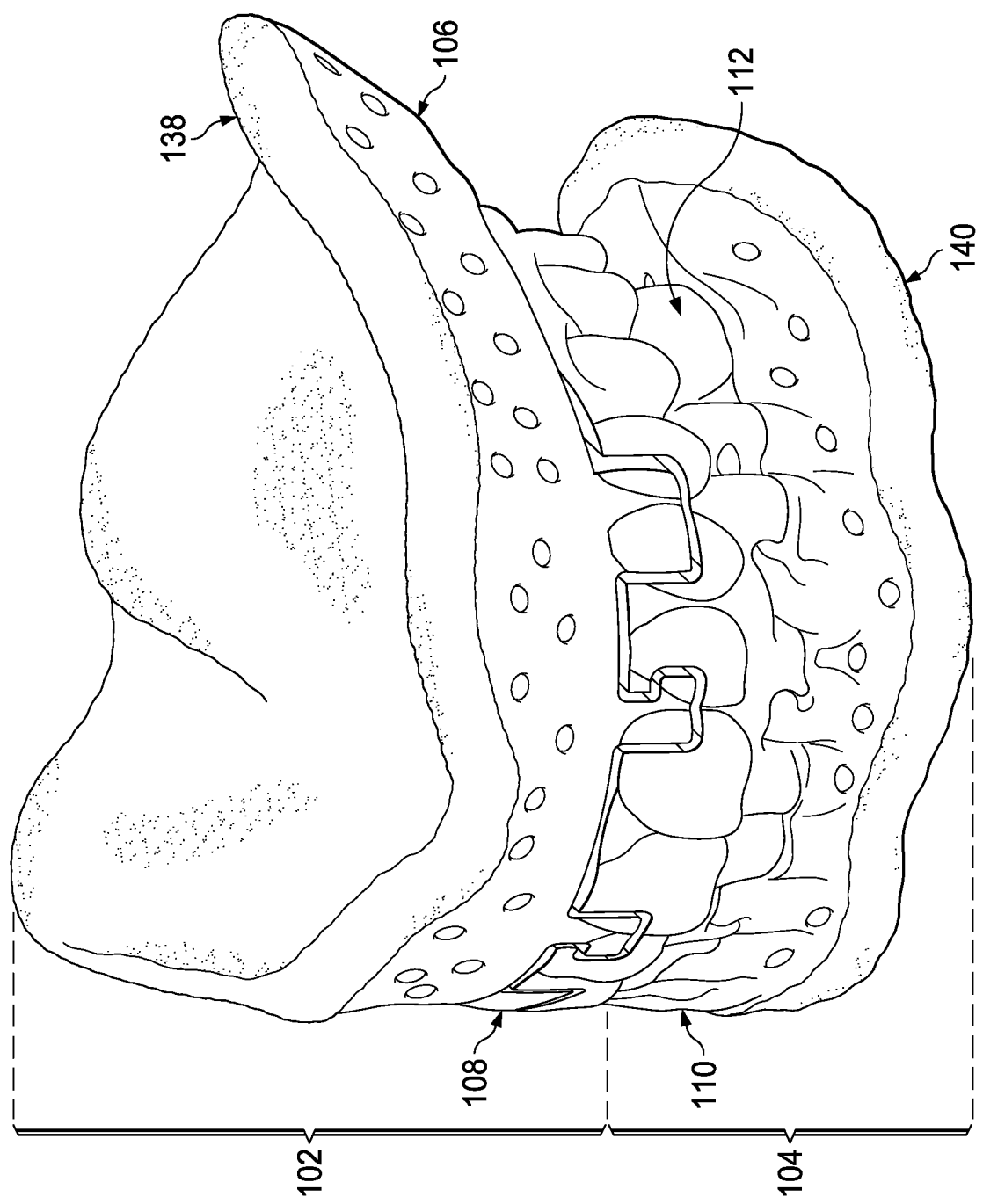
FIG. 1E illustrates a front-angular perspective view of a dental impression tray system, according to one embodiment of the disclosure.

FIG. 1E illustrates a front-angular perspective view of a dental impression tray system 100, according to one embodiment of the disclosure. In some embodiments, a dental impression tray system 100 may be configured to have a precision fit against at least one of a patient's top and bottom alveolar ridges. As illustrated in FIG. 1E, in some embodiments, a dental tray system 100 may be configured to have a precision fit against a patient alveolar ridge (not shown) as a result of at least one of a molded top gasket 138 and a molded bottom gasket 140.

A molded top gasket 138, in some embodiments, may be configured to fit within an upper trough 116. In some embodiments, a molded top gasket 138 may be formed by placing a moldable material within an upper trough 116 of a top dental impression tray 106 and fitting the top dental impression tray against a patient's top edentulous alveolar ridge with sufficient pressure to form an impression of the top alveolar ridge.

In some embodiments a molded bottom gasket 140, in some embodiments, may be configured to fit within a lower trough 120. In some embodiments, a molded bottom gasket 140 may be formed by placing a moldable material within a lower trough 120 of a bottom dental impression tray 110 and fitting the bottom dental impression tray against a patient's bottom edentulous alveolar ridge with sufficient pressure to form an impression of the bottom alveolar ridge.

Figure 2A:
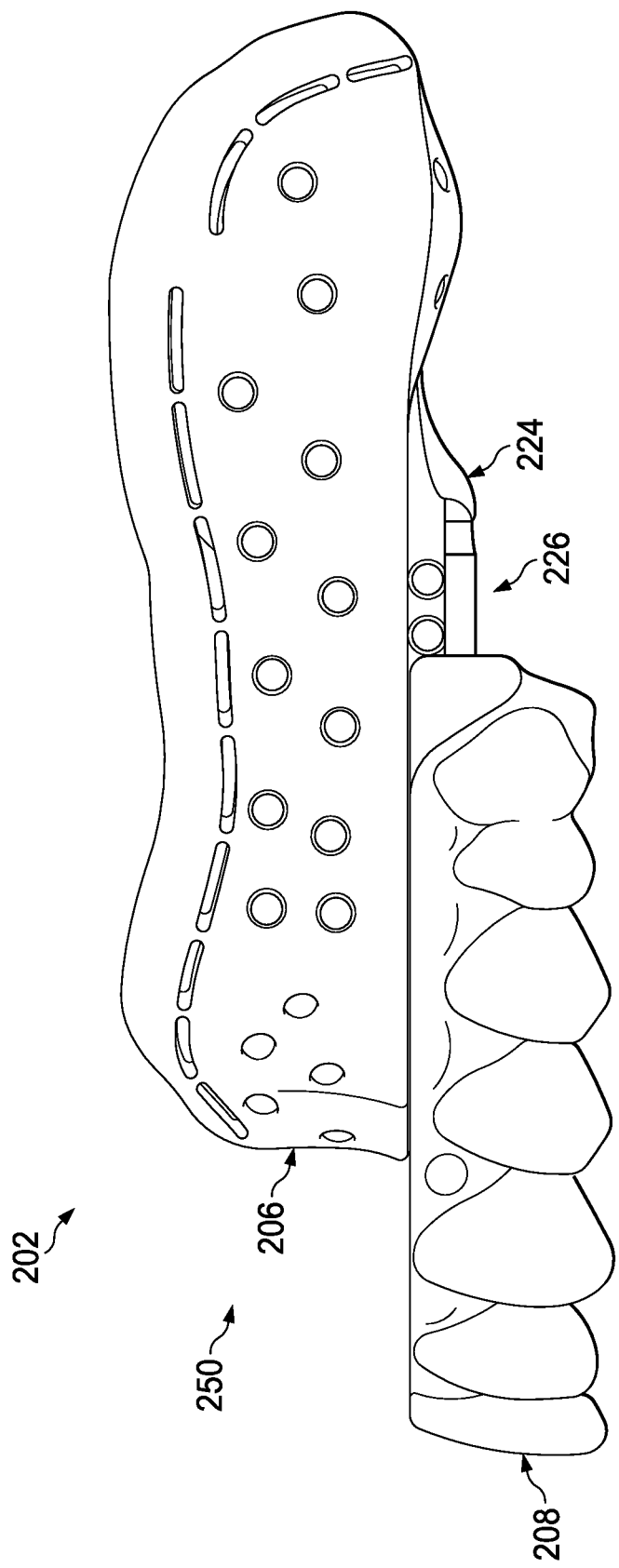
FIG. 2A illustrates a side perspective view of a top denture, according to one embodiment of the disclosure.

As illustrated in FIG. 2A, according to some embodiments, a top denture 202 may include a top dental impression tray 206 and a top tooth portion 208. In some embodiments, a top tooth portion 208 may be removably attached to a top dental impression tray 206. Such removable attachment between a top tooth portion 208 and a top dental impression tray 206 may permit a practitioner to exchange the top tooth portion 208 in accordance with a patient's characteristics or an overall dental strategy. For example, a dental strategy may include a gradual progression towards a specific bite pattern or other oral conditions which may be achieved by utilizing a dental implant tray system (e.g., FIG. 1A 100) having a top dental impression tray and a first top tooth portion for a specified period of time, followed by the utilization of the dental implant tray system having the top dental impression tray and a second top tooth portion, where the first top tooth portion and the second top tooth portion have differing characteristics (e.g., composition, tooth alignment, size and shape to fit a patient's opposing arch shape, arch form anatomy, facial esthetics, muscular and tooth function).

In some embodiments, a bottom denture (e.g., FIG. 1A 104) may include a bottom dental impression tray (e.g., FIG. 1A 110) and a bottom tooth portion (e.g., FIG. 1A 112). In some embodiments, a bottom tooth portion may be removably attached to a bottom dental impression tray. Removable attachment may permit a practitioner to exchange a bottom tooth portion in accordance with a patient's characteristics or an overall dental strategy (e.g., a restorative toothed bite).

According to some embodiments, a top tooth portion or a bottom tooth portion may be removably attached to a top dental impression tray or a bottom dental impression tray respectively by an attachment system. An attachment system, in some embodiments, may include a rail and groove system. A rail and groove system may include one or more rails attached to a first article (e.g., a top dental impression tray) that is configured to slidably interact with one or more grooves on a second article (e.g., a top tooth portion) such that the first article and the second article are removably attached. A first article may include a top dental impression tray, a bottom dental impression tray, a top tooth portion, or a bottom tooth portion, in some embodiments. A second article is configured to correspond to the first article, such that each dental impression tray corresponds to a respective tooth portion. According to some embodiments, a rail and groove system may include one or more rails configured to slidably attach to a corresponding number of grooves. A rail may be configured to have any characteristics (e.g., shape (L-shaped), height, width, composition) suitable for removably attaching a first article to a second article. A groove may be configured to have any characteristics (e.g., shape, depth, width, composition) suitable for receiving a rail.

As illustrated in FIG. 2A, a top dental impression tray 206 may include one or more rails 224 fixedly attached to or integrally incorporated onto (e.g., manufactured as a single piece) at least a portion of a cavity side (i.e., facing away from a patient's jaw and towards a patient's oral cavity) 226 of a top dental impression tray 206. In some embodiments one or more rails 224 may be fixedly attached to or integrally incorporated onto (e.g., manufactured as a single piece) an anterior end 250 (i.e., facing a patient's mouth and lips) of a cavity side 226 of a top dental impression tray 206. In some embodiments, a rail system may include multiple rails with each of the rails being spaced apart from one another (e.g., evenly spaced, unevenly spaced). According to some embodiments, a rail system may include multiple rails parallel to one another.

Figure 2B:
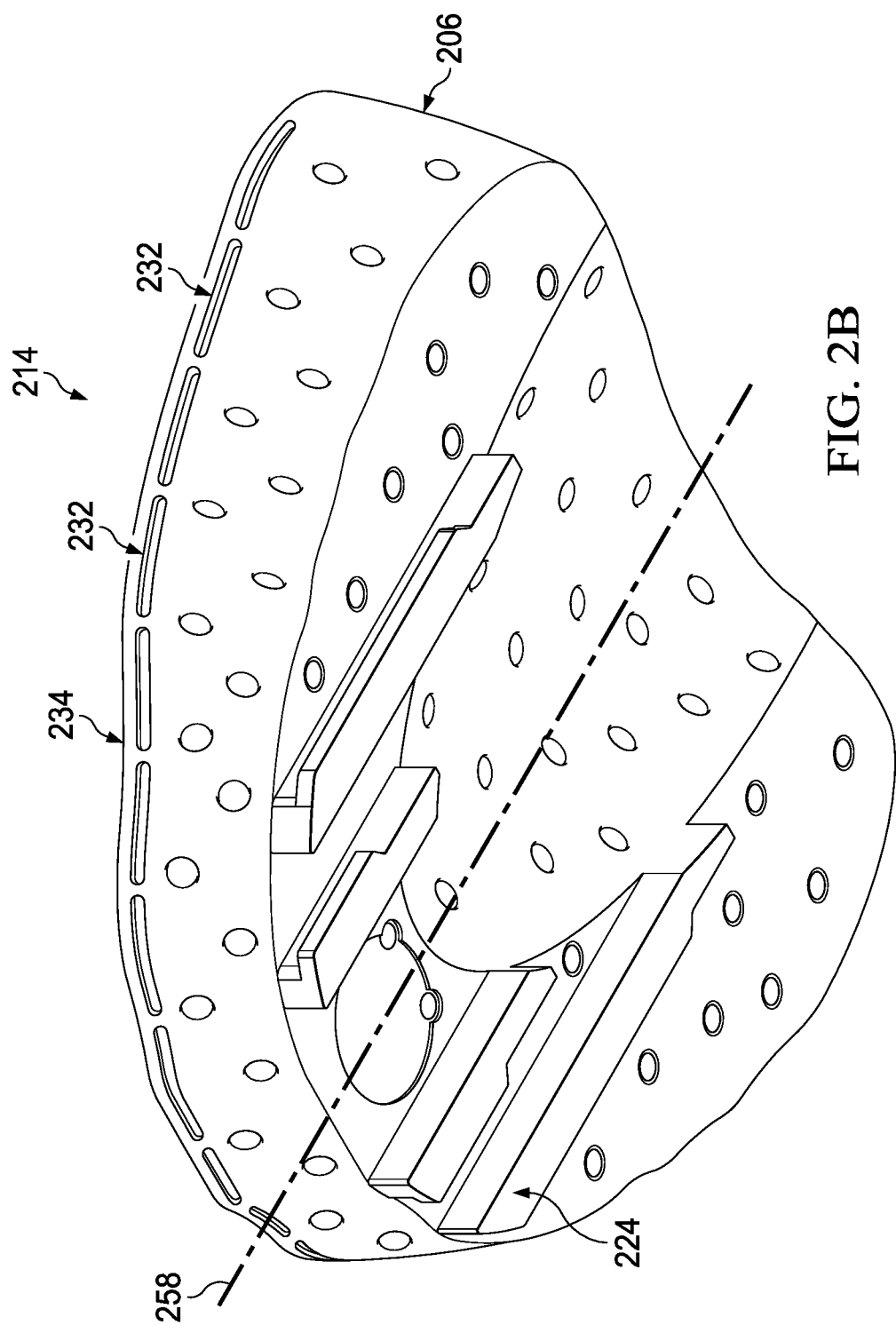
FIG. 2B illustrates an angled side view of a top dental impression tray, according to one embodiment of the disclosure.

FIG. 2B illustrates an angled side-view of a top dental impression tray 206, according one embodiment of the disclosure. As illustrated, in some embodiments, a top dental impression tray 206 may include multiple perforations 232 extending substantially parallel to a proximate edge 234 of a mandibular side 254 (i.e., an edge of the mandibular side closest to a patient's gum tissue).

As shown in FIG. 2B, in some embodiments, a rail may have an L-shaped lateral cross section. According to some embodiments, a rail may have an L-shaped lateral cross section with a short end of the L-shaped cross-section pointing away from a midline 258 of a dental tray.

Figure 2C:
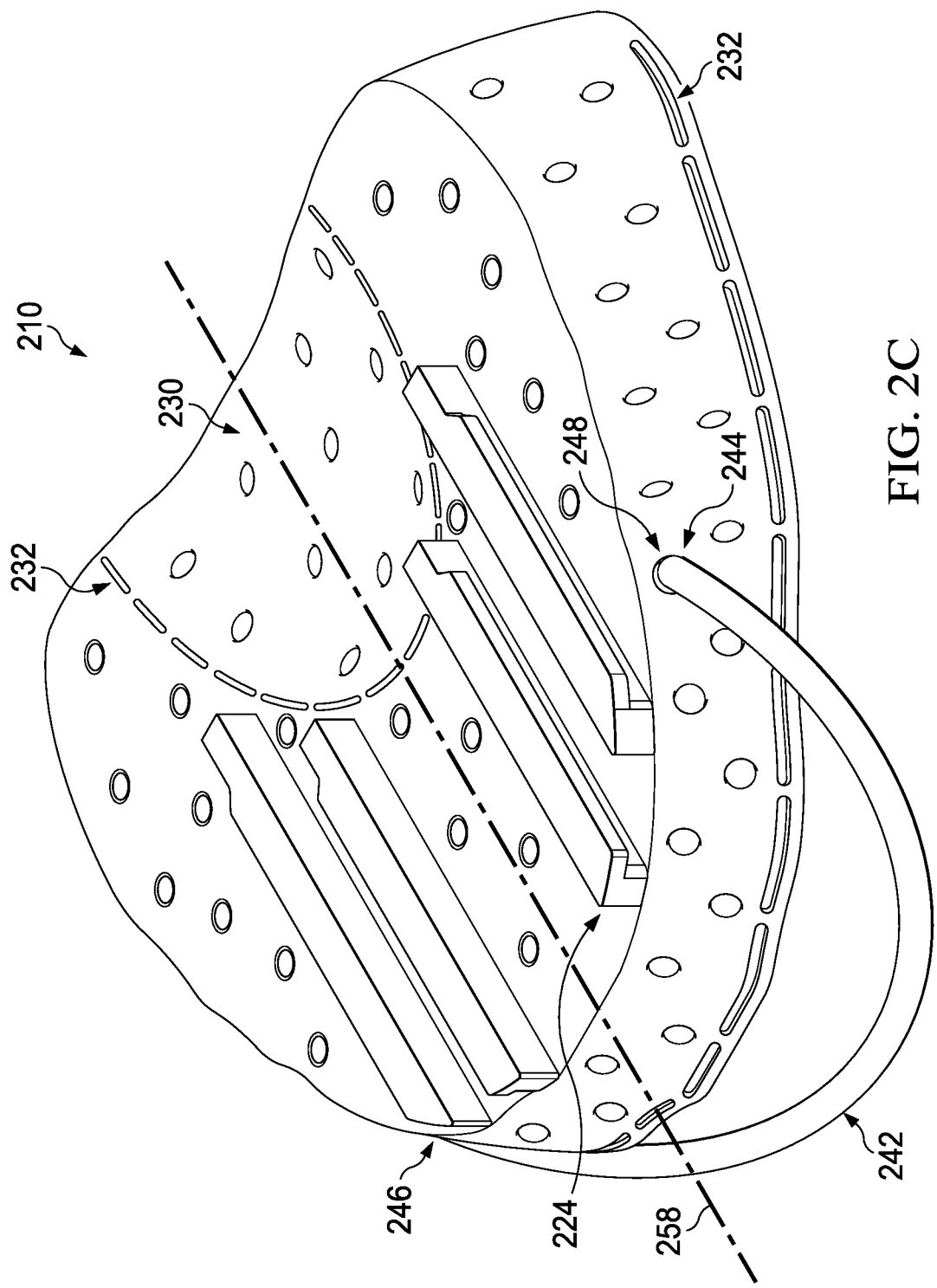
FIG. 2C illustrates an angled side view of a bottom dental impression tray, according to one embodiment of the disclosure.

FIG. 2C illustrates an angled side-view of a bottom dental impression tray 210, according one embodiment of the disclosure. As shown in FIG. 2C, in some embodiments, a rail 224 may have an L-shaped lateral cross section. According to some embodiments, a rail 224 may have an L-shaped lateral cross section with a short end of the L-shaped cross-section pointing away from a midline 258 of a dental tray.

As illustrated in FIG. 2C, a bottom dental impression tray 210 may be configured to accommodate a patient's tongue, according to some embodiments. In some embodiments, a bottom dental impression tray may include a tongue cutout region 230 intended to accommodate a patient's tongue. According to some embodiments, a top dental impression tray and a bottom dental impression tray may be substantially identical. In some embodiments, a single design of a dental impression tray may be configured such that the dental impression tray may be used as is for a top dental impression tray and may be readily adapted to form a bottom dental impression tray by forming a tongue cutout (e.g., removal of tongue cut out portion using perforations). As shown in FIG. 2C, a dental impression tray may include a series of perforations 232 outlining a tongue cutout region 230, such that a practitioner may more readily remove a portion of the dental impression tray to form the tongue cutout. In some embodiments, a series of perforations outlining a tongue cutout may be located in the region surrounding a hard palate portion (e.g., FIG. 1A 128) of a dental impression tray.

As illustrated in FIG. 2C, in some embodiments, at least one of a top dental impression tray and a bottom dental impression tray may include a handle 242 (e.g., a V-shaped handle). A handle 242 may be configured to allow easier manipulation of a dental impression tray (e.g., top, bottom), for example to facilitate precision placement in a patient's mouth.

According to some embodiments, a handle 242 may form a V-shape. In some embodiments, a dental impression tray (e.g., top, bottom) may be configured to removably receive each of a first end 244 and a second end 246 of handle 242 within a first receptor 248 and a second receptor respectively. A handle 242, in some embodiments, may be composed of a flexible material to facilitate removable attachment of a first end 244 and a second end of the handle 242 within a first receptor 248 and a second receptor respectively.

Figure 2D:
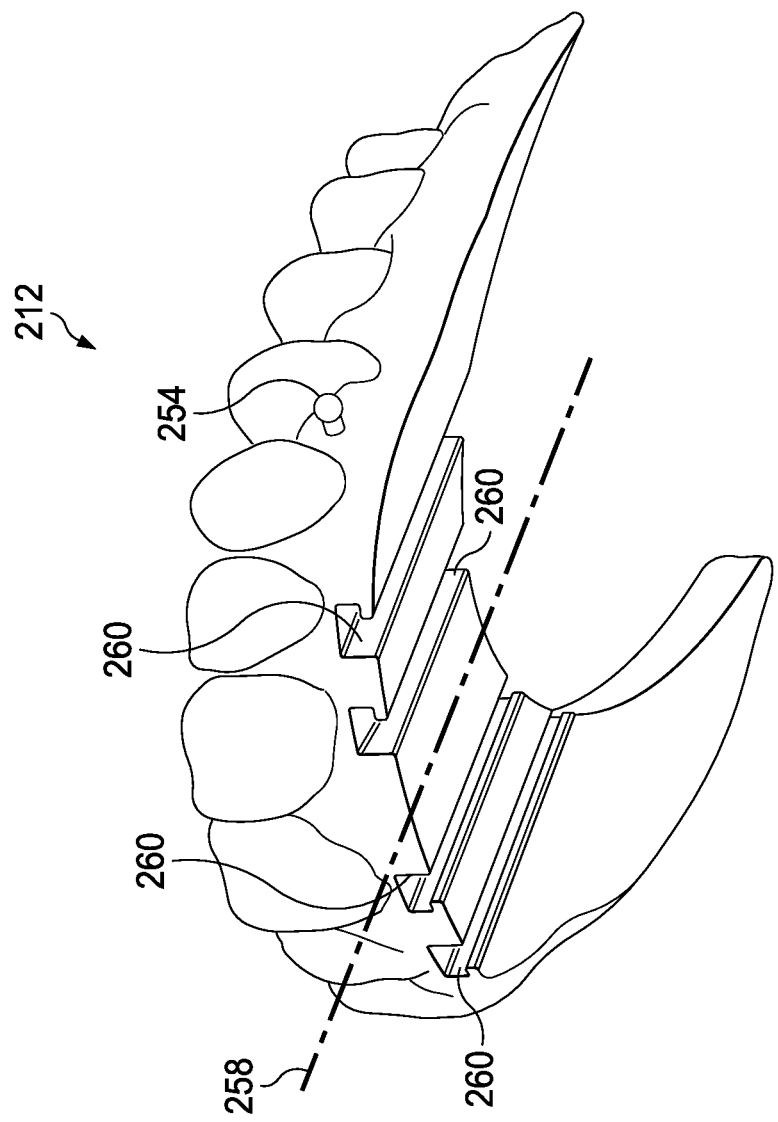
FIG. 2D illustrates an angled side view of a bottom tooth portion, according to one embodiment of the disclosure.

FIG. 2D illustrates an angled side view of a bottom tooth portion 212, according to one embodiment of the disclosure. At least one of a top tooth portion and a bottom tooth portion may be configured to resemble a row of teeth as generally found on an alveolar ridge. In some embodiments, a dental implant tray system may be configured such that a top tooth portion is oriented to align with a bottom tooth portion to substantially establish bite registration.

A tooth portion may include a rail system or a groove system corresponding to the respective groove system or rail system of the corresponding dental impression tray, in some embodiments. As illustrated in FIG. 2D, a bottom tooth portion 212 may include multiple grooves 260, each configured to receive a corresponding rail (e.g., FIG. 2C 224). In some embodiments, a groove may have an L-shaped lateral cross section. According to some embodiments, a groove may have an L-shaped lateral cross section with a short end of the L-shaped cross-section pointing away from a midline 258 of a tooth portion.

In some embodiments, a tooth portion (e.g., a top tooth portion, a bottom tooth portion) may include one or more apertures 254 configured to penetrate the tooth portion and at least one groove 260. An aperture may permit a fixative (e.g., adhesive, cement) to be inserted between a rail and a groove to permit permanent or semi-permanent attachment between a tooth portion and a dental impression tray.

According to some embodiments, a portion of a rail-groove interface visible on an anterior surface of at least one of a top denture and a bottom denture may be reduced by configuring a rail system to only partially traverse a width of a dental impression tray and configuring a groove system to only partially traverse a width of a tooth portion anterior to posterior and from cheek to cheek (lateral).

Figure 3:
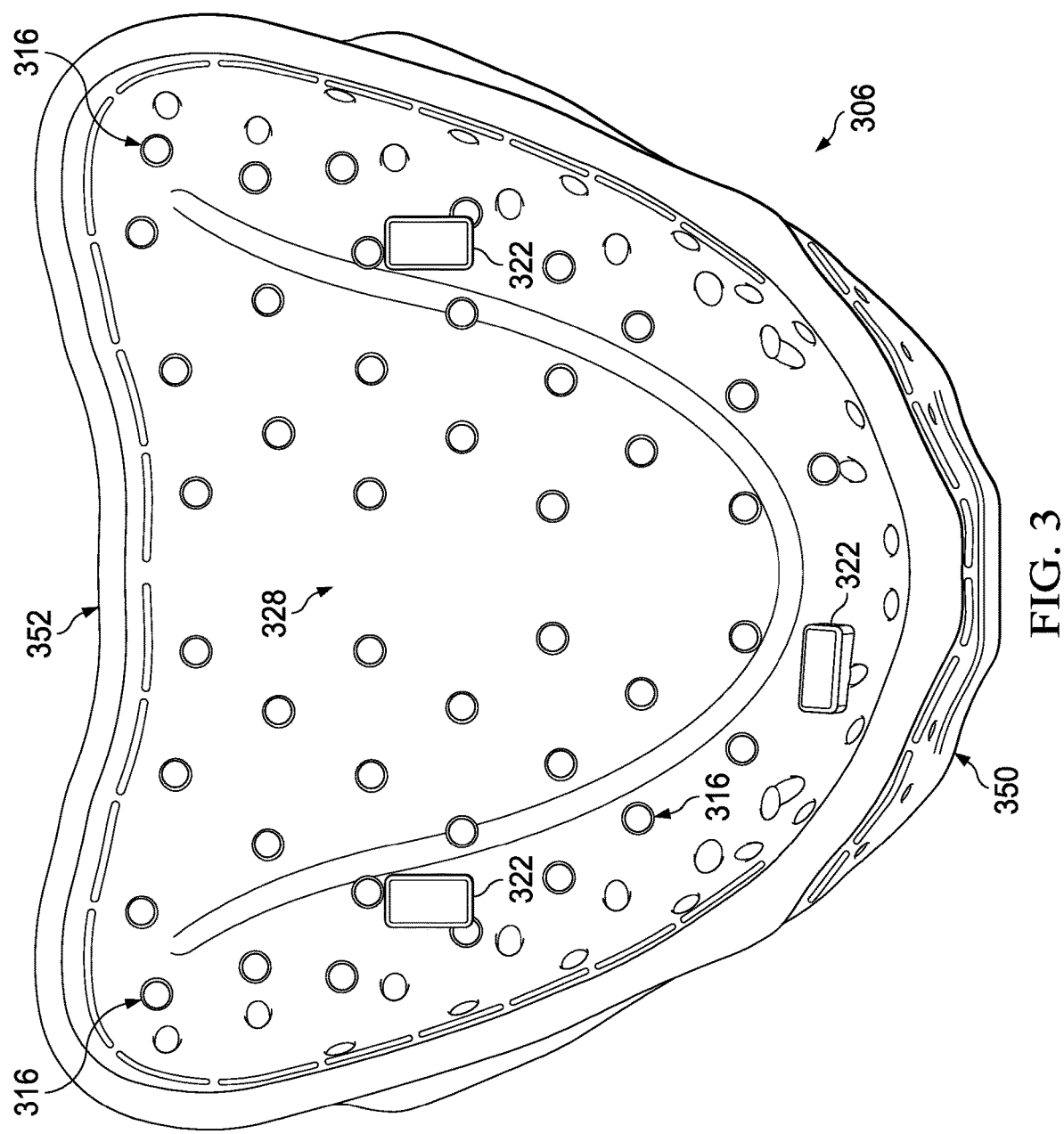
FIG. 3 illustrates an aerial view of a denture impression tray, according to one embodiment of the disclosure.

FIG. 3 illustrates an aerial view of a top dental impression tray 306, according to one embodiment of the disclosure. A top dental impression tray 306 may be configured to be oriented in a patient's oral cavity having an anterior end 350 facing the patient's mouth and lips and the posterior end 352 facing the patient's throat. A palatal side, as illustrated in the aerial view of FIG. 3, may be configured to include an upper trough 316 configured to fit adjacent to a patient's edentulous alveolar ridge. A top dental impression tray 306 may include a hard palate portion 328 configured to fit adjacent to a patient's hard palate and, in some embodiments, to support a moldable dental impression material (e.g., alginate).

An upper trough 316 of a top denture impression tray 306, in some embodiments, may include one or more space blockers 322. A space blocker 322 may be configured to penetrate a moldable impression material (e.g., alginate) and to generally contact a patient's top alveolar ridge such that the patient is signaled to stop applying pressure to the moldable impression material (e.g., to stop biting down). Accordingly, in some embodiments, a space blocker 322 may substantially prevent a patient from applying too much pressure to the impression material (e.g., biting down to a bottom region of a U-shaped trough) and thereby facilitate proper impression formation.

Method of Using a Dental Impression Tray System

Figure 4:
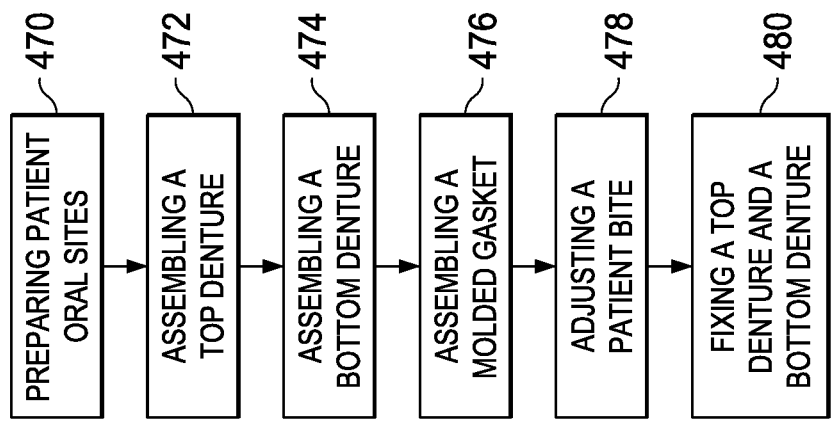
FIG. 4 is a flow diagram illustrating a method of using a dental implant tray system, according to one embodiment of the disclosure.

The present disclosure further relates to a method of using a dental impression tray system. According to some embodiments, a method of using a dental impression tray system may generate a final denture pair suitable for long-term use and provide a patient with a suitable bite alignment. As illustrated in FIG. 4, a method of using a dental impression tray system may include: preparing one or more patient oral sites; assembling a top denture; assembling a bottom denture; forming a top mold gasket and a bottom mold gasket; adjusting the patient's bite; fixing a top denture and a bottom denture; processing the fixed top denture and the fixed bottom denture to generate a final denture pair.

According to some embodiments, a method of using a dental impression tray system may include preparing one or more patient oral sites 470. For example, if a patient is not fully edentulous and is desirous of dentures, preparing one or more patient oral sites may include extraction of the patient's remaining teeth and permitting the patient's gum tissues to heal.

A method may further include, in some embodiments, assembling a top denture 472. A top denture includes a top dental impression tray and a top tooth portion. In some embodiments, one or more rails may be slidably attached to a first article (e.g., a top dental impression tray) to one or more grooves on a second article (e.g., a top tooth portion) such that the first article and the second article are removably attached to form a top denture. A first article may include a top dental impression tray, a bottom dental impression tray, a top tooth portion, or a bottom tooth portion, in some embodiments. A second article is configured to correspond to the first article, such that each dental impression tray corresponds to a respective tooth portion.

In some embodiments, assembling a top denture 472 may include configuring a top dental impression tray portion to more closely fit a patient's top alveolar ridge. Configuring a top dental impression tray to more closely fit a patient's top alveolar ridge may include adjusting a depth of an upper trough of the top dental impression tray by cleaving one or more perforations extending parallel to a proximate edge (e.g., FIG. 1A 132) of a palatal side (e.g., FIG. 1A 114) (i.e., an edge of the palatal side closest to a patient's gum tissue) of the top dental impression tray.

According to some embodiments, assembling a top denture 472 may further include attaching a handle (e.g., FIG. 2C 242) to a top dental impression tray.

As illustrated in FIG. 4, a method may include assembling a bottom denture 474. As shown in FIG. 1D, a bottom denture 104 may include a bottom dental impression tray 110 and a bottom tooth portion. In some embodiments, assembling a bottom denture includes slidably attaching one or more rails attached to a first article (e.g., a bottom dental impression tray) to one or more grooves on a second article (e.g., a bottom tooth portion) such that the first article and the second article are removably attached.

In some embodiments, assembling a bottom denture 474 may include configuring a bottom dental impression tray portion to include a tongue cut out. According to some embodiments, a top dental impression tray and a bottom dental impression tray may be substantially identical. In some embodiments, a single design of a dental impression tray may be configured such that the dental impression tray may be used as is for a top dental impression tray and may be readily adapted to form a bottom dental impression tray (e.g., FIG. 1A 110) by removing a tongue cut out portion by cleaving along perforations located in a region surrounding a hard palate portion (e.g., FIG. 1A 128) of a dental impression tray.

According to some embodiments, assembling a bottom denture 474 may further include attaching a handle (e.g., FIG. 2C 242) to a bottom dental impression tray.

The steps of assembling a top denture 472 and assembling a bottom denture 474 may be performed in any order or concurrently without deviating from the scope of the present disclosure.

As illustrated in FIG. 4, a method of using a dental impression tray system may include forming a top molded gasket (e.g., FIG. 1E 138) and a bottom molded gasket (e.g., FIG. 1E 140) 476. Forming a top molded gasket may include inserting a moldable material within an upper trough (e.g., FIG. 1A 116) of a top dental impression tray (e.g., FIG. 1A 106) and fitting the top dental impression tray against a patient's top edentulous alveolar ridge with sufficient pressure to form an impression of the top alveolar ridge. According to some embodiments, forming a top molded gasket may further include inserting a moldable material adjacent to a hard palate portion (e.g., FIG. 1A 128) of a top dental impression tray (e.g., FIG. 1A 106) prior to fitting the top dental impression tray against a patient's top edentulous alveolar ridge. According to some embodiments, forming a top molded gasket may include fitting a top dental impression tray against a patient's top edentulous alveolar ridge until the top alveolar ridge meets at least one space blocker (e.g., FIG. 1A 122).

Forming a bottom molded gasket may include inserting a moldable material within a lower trough (e.g., FIG. 1C 120) of a bottom dental impression tray (e.g., FIG. 1C 110) and fitting the bottom dental impression tray against a patient's bottom edentulous alveolar ridge with sufficient pressure to form an impression of the bottom alveolar ridge. In some embodiments, forming a bottom molded gasket may include fitting a bottom dental impression tray against a patient's bottom edentulous alveolar ridge until the bottom alveolar ridge meets at least one space blocker (e.g., FIG. 1A 122).

According to some embodiments, forming a top molded gasket (e.g., FIG. 1E 138) and a bottom molded gasket (e.g., FIG. 1E 140) 476 may further include forming a bite alignment by bringing together a top tooth portion of a top denture and a bottom tooth portion of a bottom denture within a patient's mouth while a palatal side of the top dental impression tray is fitted to a patient's top alveolar ridge and a mandibular side of the bottom dental impression tray is fitted against a patient's bottom alveolar ridge. Forming a top molded gasket and a bottom molded gasket 476 may include maintaining a bite alignment until a moldable material has sufficiently hardened or set. According to some embodiments, forming a top molded gasket and a bottom molded gasket 476 may further include removing at least one of a top denture, a bottom denture, a top molded gasket, and a bottom molded gasket from a patient's oral cavity.

As illustrated in FIG. 4, a method of using a dental impression tray system may include adjusting a patient bite 478. According to some embodiments, one or more of a top tooth portion and a bottom tooth portion of a dental implant tray system may be exchanged for other teeth portions to modify a patient's bite alignment forming at least one of a modified top teeth portion and a modified bottom teeth portion. In some embodiments other teeth portions may include one or more teeth having a size, profile, color, alignment, or any combination thereof that differs from a corresponding tooth in a top tooth portion or a bottom tooth portion used in method steps 472, 474, or 476. Adjusting a patient bite 478, in some embodiments, may include bringing together a top denture and a bottom denture having at least one of a modified top tooth portion and a modified bottom tooth portion within a patient's mouth while a palatal side of the top dental impression tray is fitted to a patient's top alveolar ridge and a mandibular side of the bottom dental impression tray is fitted against a patient's bottom alveolar ridge. Further, adjusting a patient bite 478 may include confirming a patient's bite registration, occlusal vertical dimension, esthetics, phonetics, other oral conditions, or any combination thereof.

This step can be repeated until a desired patient bite is accomplished. Further, adjusting a patient bite 478 may include finalizing one or more of a top tooth portion, a bottom tooth portion, a modified top tooth portion, a modified bottom tooth portion including trimming, cutting, polishing, or any combination thereof.

As illustrated in FIG. 4, a method of using a dental impression tray system may include fixing a top denture and a bottom denture 480. According to some embodiments, a top denture and a bottom denture may be fixed by applying a fixative (e.g., adhesive cement) to one or more regions of the top denture or the bottom denture. Fixing a top denture and a bottom denture 480 may include (a) semi-permanently or permanently affixing a top dental impression tray to a top tooth portion or modified top tooth portion a tooth portion and (b) semi-permanently or permanently affixing a bottom dental impression tray to a bottom tooth portion or a modified bottom tooth portion. In some embodiments affixing (e.g., semi-permanently or permanently) a dental impression tray (e.g., top, bottom) to a tooth portion or modified tooth portion may include inserting a fixative (e.g., adhesive, cement) through one or more apertures (e.g. FIG. 2D 254) such that the fixative penetrates both a tooth portion and at least one groove (e.g., FIG. 2D 260) and forming a fixed top denture and a fixed bottom denture. Fixing a top denture and a bottom denture 480 may include, in some embodiments, setting a fixative and removing a fixed top denture and a fixed bottom denture from a patient's oral cavity.

As illustrated in FIG. 4, a method of using a dental impression tray system may include processing a fixed top denture and a fixed bottom denture to generate a final denture pair. According to some embodiments, a fixed top denture and a fixed bottom denture may be used as is or with minor finishing, including polishing, trimming, cutting, or shaping. In some embodiments, processing a fixed top denture and a fixed bottom denture to generate a final denture pair may include scanning at least one of the fixed top denture and the fixed bottom denture using various scanning modalities to generate a data set including patient specific parameters and measurements that may be used to manufacture a patient-specific denture set. According to some embodiments, various scanning modalities may include, but are not limited to: utilizing non-superimposition and superimposition of 3-D radiographs utilizing CBCT cone beam computed tomography, magnetic resonance imaging, ultrasound, Intra-Oral and Extra-Oral tooth and soft tissue dental impression digital scanners working under the principles of white light optical triangulation and ultrafast optical sectioning, confocal microscopy (e.g., optical, laser, optical laser, soft tissue lasers), or any combination thereof.

The present disclosure further relates to a method of using a dental impression tray system in a situation where a patient is only edentulous on a single jaw (e.g., top jaw edentulous, bottom jaw edentulous). In such situations a patient may desire only a single denture rather than a denture pair. According to some embodiments, a method of using a dental impression tray system may include: preparing one or more patient oral sites; assembling a top denture or a bottom denture; forming a respective top mold gasket or a respective bottom mold gasket; adjusting the patient's bite; fixing the top denture or the bottom denture; and processing the fixed top denture or the fixed bottom denture to generate a final denture.

Persons skilled in the art may make various changes in the shape, size, number, separation characteristic, and/or arrangement of parts without departing from the scope of the instant disclosure. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a device, and/or system of the disclosure. Where desired, some embodiments of the disclosure may be practiced to the exclusion of other embodiments.

These equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

What is claimed is:

1. A dental tray impression system, the system comprising at least one of a top denture and a bottom denture,
   (a) the top denture comprising:
      (i) a top dental impression tray comprising:
         (A) a cavity side extending between an anterior end and a posterior end, and
         (B) an upper trough on a palatal side and configured such that the upper trough fits adjacent to a top alveolar ridge of a patient's mouth, and (ii) a top tooth portion configured to removably attach to the cavity side of the top dental impression tray by sliding along the cavity side of the top dental impression tray along an elongated path extending between the anterior end of the cavity side and the posterior end of the cavity side of the top dental impression tray; and (b) the bottom denture comprising:
(i) a bottom dental impression tray comprising: a lower trough on a mandibular side and configured such that the lower trough fits adjacent to a bottom alveolar ridge of the patient's mouth, and
(ii) a bottom tooth portion configured to removably attach to a cavity side of the bottom dental impression tray,
wherein the upper trough and the lower trough are configured to contain at least a portion of a moldable dental impression material.

2. The dental impression system of claim 1, further comprising at least one rail and groove system, the rail and groove system comprising one or more rails attached to a first article and one or more grooves attached to a second article,
wherein the one or more rails are configured to slidably interact with the one or more grooves thereby allowing the first article and the second article to be removably attached,
wherein the first article is one article selected from the top dental impression tray, the bottom dental impression tray, the top tooth portion, and the bottom tooth portion, and
wherein the second article is another article selected from the top tooth portion, the bottom tooth portion, the top dental impression tray, and the bottom dental impression tray, and
wherein the second article is configured to correspond to the first article.

3. The dental impression system of claim 2, further comprising a first rail and groove system and a second rail and groove system,
wherein the first rail and groove system comprises:
(i) a first rail fixedly attached to or integrally incorporated onto the cavity side of the top dental impression tray, and
(ii) a first groove incorporated into the top tooth portion and configured to receive the first rail;
wherein the second rail and groove system comprises:
(i) a second rail fixedly attached to or integrally incorporated onto the cavity side of the bottom dental impression tray, and
(ii) a second groove incorporated into the bottom tooth portion and configured to receive the second rail.

4. The dental impression system of claim 3, wherein at least one of (a) the first rail and the first groove and (b) the second rail and the second groove have an L-shaped lateral cross section with a short end of the L-shaped cross-section pointing away from a midline of the top dental impression tray or a midline of the bottom dental impression tray.

5. The dental impression system of claim 1 further comprising a hard palate portion on the palatal side of the top dental impression tray and configured to fit adjacent to a hard palate of the patient's mouth.

6. The dental impression system of claim 1, wherein at least one of the upper trough and the lower trough have a U-shape.

7. The dental impression system of claim 1, wherein at least one of the upper trough and the lower trough further comprises at least one space blocker configured to penetrate the moldable impression material.

8. The dental impression system of claim 1, wherein at least one of the top dental impression tray and the bottom dental impression tray further comprise at least one indentation configured to enhance fixation of the moldable material to one or more regions of at least one of the top dental impression tray and the bottom dental impression tray.

9. The dental impression system of claim 1, wherein at least one of the top dental impression tray and the bottom dental impression tray further comprise multiple perforations extending substantially parallel to a proximate edge of the palatal side or a proximate edge of the mandibular side respectively.

10. The dental impression system of claim 1,
wherein the top dental impression tray and the bottom dental impression tray each further comprises a series of perforations outlining a hard palate region and configured to permit cleavage and removal of the hard palate region to generate a tongue cutout.

11. The dental impression system of claim 1, further comprising at least one of a molded top gasket and a molded bottom gasket,
wherein the top molded gasket is configured to fit at least partially within the upper trough and sit adjacent to at least a portion of the top alveolar ridge, and
wherein the bottom molded gasket is configured to fit at least partially within the lower trough and sit adjacent to at least a portion of the bottom alveolar ridge.

12. The dental impression system of claim 3, wherein the top tooth portion comprises a first aperture configured to penetrate the top tooth portion adjacent to at least a portion of the first groove,
wherein the bottom tooth portion comprises a second aperture configured to penetrate the bottom tooth portion adjacent to at least a portion of the second groove.

13. A dental tray impression system, comprising:
(a) a first dental impression tray comprising:
(i) a first surface defining a trough configured to fit adjacent to an alveolar ridge of a patient's mouth, wherein the trough is configured to contain at least a portion of a moldable dental impression material,
(ii) a cavity surface extending from an anterior portion to a posterior portion, and
(iii) a first coupling extending along an elongated path between the anterior portion of the cavity surface and the posterior portion of the cavity surface,
wherein the first coupling is located on the cavity surface; and
(b) a first tooth portion comprising a second coupling configured to removably attach to the first coupling of the first dental impression tray by sliding with the entirety of the first tooth portion, along the path relative to the first dental impression tray between the anterior portion and the posterior portion of the cavity surface.

14. The dental tray impression system of claim 13, wherein the first coupling comprises an elongated rail, wherein the second coupling comprises an elongated groove configured to receive the elongated rail.

15. The dental tray impression system of claim 14, wherein the elongated rail comprises an L-shaped cross-section.

16. The dental tray impression system of claim 13, wherein the first surface of the first dental impression tray defines a plurality of indentations.

17. The dental tray impression system of claim 13, wherein the first surface of the first dental impression tray comprises a space block, wherein the space block is spaced away from a perimeter of the first surface.

18. The dental tray impression system of claim 13, further comprising a second dental impression tray and a second tooth portion, wherein the second dental impression tray extends between a second anterior portion and a second posterior portion, wherein the second tooth portion is configured to removable attach with the second dental impression tray by sliding along a second path extending between the second anterior portion and the second posterior portion.

19. The dental tray impression system of claim 13, further comprising a second tooth portion, wherein the second tooth portion is configured to removably attach to the first coupling of the first dental impression tray by sliding along a path between the anterior portion and the posterior portion of the cavity surface.

* * * * *